US006070176A

United States Patent [19]
Downs et al.

[11] Patent Number: 6,070,176
[45] Date of Patent: *May 30, 2000

[54] METHOD AND APPARATUS FOR GRAPHICALLY REPRESENTING PORTIONS OF THE WORLD WIDE WEB

[75] Inventors: Terry Downs, Portland; Gregory H. Kisor, Beaverton, both of Oreg.

[73] Assignee: Intel Corporation, Santa Clara, Calif.

[*] Notice: This patent issued on a continued prosecution application filed under 37 CFR 1.53(d), and is subject to the twenty year patent term provisions of 35 U.S.C. 154(a)(2).

[21] Appl. No.: 08/790,537

[22] Filed: Jan. 30, 1997

[51] Int. Cl.$^7$ ..................................................... G06F 17/30
[52] U.S. Cl. ........................................... 707/513; 395/355
[58] Field of Search .................................... 707/102, 103, 707/5, 10; 395/600, 355

[56] References Cited

U.S. PATENT DOCUMENTS

| | | | |
|---|---|---|---|
| 4,752,889 | 6/1988 | Rappaport et al. | 364/513 |
| 5,528,735 | 6/1996 | Strasnick et al. | 395/127 |
| 5,544,352 | 8/1996 | Egger | 395/600 |
| 5,671,381 | 9/1997 | Strasnick et al. | 395/355 |
| 5,864,845 | 1/1999 | Voorhees et al. | 707/5 |
| 5,864,846 | 1/1999 | Voorhees et al. | 707/5 |
| 5,864,863 | 1/1999 | Burrows | 707/103 |
| 5,884,309 | 3/1999 | Vaneschanos, Jr. | 707/10 |

FOREIGN PATENT DOCUMENTS

| | | | |
|---|---|---|---|
| 0 435 601 A2 | 7/1991 | European Pat. Off. | H04N 1/387 |
| 0 435 601 A3 | 7/1991 | European Pat. Off. | H04N 1/387 |
| 0 447 095 A2 | 9/1991 | European Pat. Off. | G06F 15/72 |
| 0 535 986 A2 | 4/1993 | European Pat. Off. | G06F 3/033 |

OTHER PUBLICATIONS

Peck, Susan B. and Linda Mui, "Managing Your Web Using WebView," *Building Your Own Website*, pp. 45–76 (Chapter 4), May 1995.

Andrews, Pichler, and Wolf, "Towards rich information landscapes for visualizing structured web spaces," Proceedings IEEE Symposium on Information Visualization '96, San Francisco, Ca USA, IEEE Computer Society Press, Oct. 1996.

*Primary Examiner*—Frank J. Asta
*Assistant Examiner*—Thong Vu
*Attorney, Agent, or Firm*—Blakely, Sokoloff, Taylor & Zafman LLP

[57] ABSTRACT

A technique is provided for displaying a map of a portion of the World Wide Web. A number of Web documents are retrieved by a client computer system executing a search engine. Web documents are then represented on a display device as objects and the relevance of the Web documents to the search criteria is indicated by the apparent distance of the corresponding object to the user. Hypertext links between Web documents are represented as arrows between the objects. Additional information relating to Web sites, such as the popularity of a Web site, the length of a Web document, and the number of hypertext links in a Web document, are represented to the user visually using visual attributes of objects, such as color, shape, and texture.

46 Claims, 8 Drawing Sheets

FIG_1

FIG_2

FIG_6

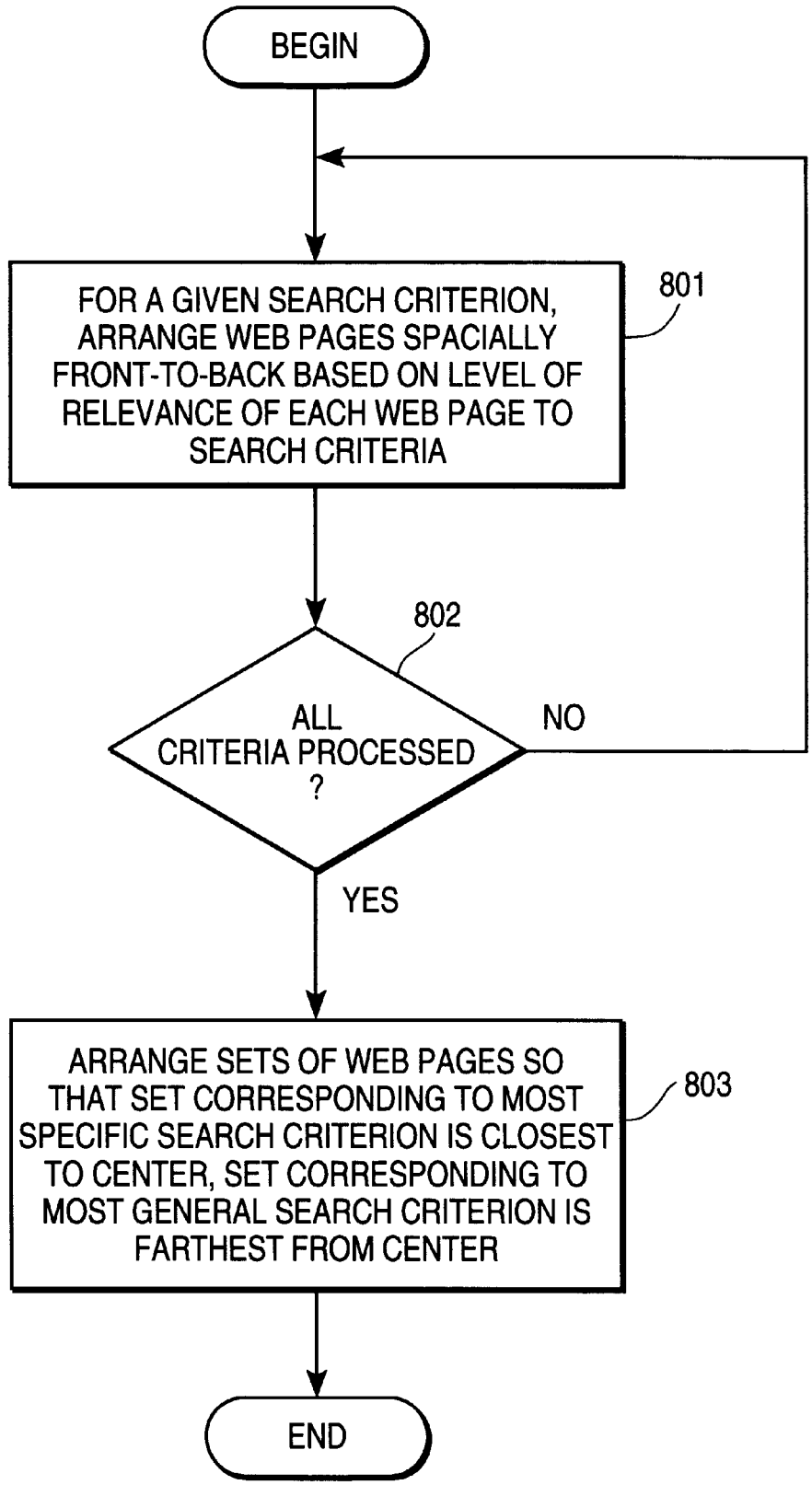

METHOD AND APPARATUS FOR GRAPHICALLY REPRESENTING PORTIONS OF THE WORLD WIDE WEB

FIELD OF THE INVENTION

The present invention pertains to the field of computer systems. More particularly, the present invention relates to graphically representing hypertext documents distributed over a network.

BACKGROUND OF THE INVENTION

The World Wide Web ("the Web") is a collection of formatted, hypertext-based documents (often referred to as "Web pages") distributed among numerous computers around the world which are logically connected by the Internet. The Web is a valuable resource for information relating to numerous subjects, including science, technology, business, entertainment, and travel, to name just a few. Improvements in Web-related technology, such as Web browsers (software applications which provide graphical user interfaces to the Web), have made the Web accessible to a large segment of the population. Despite these improvements, however, modern Web technology still has numerous shortcomings.

Web documents commonly reference other Web documents using hypertext links. A hypertext link enables a computer user to select a word, phrase or an image (a "hypertext anchor") to signal the computer retrieve a referenced Web document located on a remote server. With Web technology of the prior art, the user generally receives no explicit information regarding the relationships between Web documents. Thus, the user generally relies upon his own "mental map" of a given portion of the Web, which he slowly forms throughout the process of navigating the Web. However, this mental map is often vague, incomplete, and inaccurate. It would be useful when browsing the Web, therefore, for a user to have a clearer understanding of the logical relationships between Web documents, so that the user can more easily navigate portions of the Web.

A common way for a computer user to determine the location of information on the Web is to search the Web using software known as a search engine. A search engine accepts search criteria entered by the user, searches the Web based on the criteria, and generally provides the user with a listing of Web documents which, at least to some extent, match the criteria. Examples of well-known conventional search engines are Yahoo!, Lycos, Alta Vista, and Excite. The search engine often resides on a remote Web site, and access to the search engine is often provided by a Web browser running on the user's computer. The search results are commonly displayed in order of the number of "hits" in each Web document, i.e., the number of terms within the document which match one or more search criteria.

One problem with this method of displaying search results is that documents with little or no relevance to the user's objective are often retrieved in a search. This is so, because the number of hits in a given Web document often has no bearing on the relevance of the document to the user's search criteria. For example, some authors of Web documents have been known to repeat certain key words and phrases multiple times out of context in a Web document, in order to attract hits from search engines. Such a document may then be found by a search engine and placed high in the list of search results, although the document may be of no interest to the user. Hence, a user is generally required to screen each document for relevance by reading the brief description of the document provided by the search engine, or by actually retrieving the document.

What is needed, therefore, is an intuitive way of graphically representing a portion of the World Wide Web. What is further needed is a technique for displaying a representation of a portion of the World Wide Web, in which the relevance of Web pages to a user's search criteria and logical relationships between Web pages are indicated to a user.

SUMMARY OF THE INVENTION

The present invention includes a computer-implemented method of representing a number of data sets which are distributed among a plurality of computers on a network. In the method, a ranking of the data sets is initially received. The ranking is based on a set of criteria. A map of the data sets is then generated, such that the map visually indicates the ranking.

In another aspect of the present invention, a number of hypertext-based documents are distributed among a plurality of computers on a network. A number of objects are displayed on a display device. Each of the objects represent one of the hypertext-based documents. A parameter associated with one of the hypertext-based documents is represented using a visual attribute of an object that corresponds to that hypertext-based document.

Other features of the present invention will be apparent from the accompanying drawings and from the detailed description which follows.

BRIEF DESCRIPTION OF THE DRAWINGS

The present invention is illustrated by way of example and is not limited by the figures of the accompanying drawings, in which like references indicate similar elements and in which:

FIG. 8 is a flow diagram illustrating a particular routine for generating a three-dimensional map of a portion of the Web based on ranked search results.

DETAILED DESCRIPTION

A method and apparatus for graphically representing a portion of the World Wide Web ("the Web") are described. In the following description, for purposes of explanation, numerous specific details are set forth in order to provide a thorough understanding of the present invention. It will be evident, however, to one skilled in the art that the present invention may be practiced without these specific details. In other instances, well-known structures and devices are shown in block diagram form in order to facilitate description of the present invention.

As will be described below in detail, the present invention includes a technique for displaying a map of a portion of the Web to a user. In particular, a technique is provided by which a map includes a visual indication of the relevance of individual Web documents to a user's search criteria. This goal is accomplished by including the appearance of depth in the map, such that the map has a three-dimensional (3-D) quality. Web documents are represented as individual objects in the map, and the relevance of a given Web document to the user's search criteria is indicated by the apparent distance of the corresponding object to the user. Hypertext links between Web documents are graphically represented by arrows connecting the objects. Other information, such as the popularity of a Web site, the length of a Web document, and the number of hypertext links in a Web document, are represented to the user graphically using color, texture, shape, and other attributes.

The Web is a collection of formatted hypertext-based documents (sometimes referred to as "Web pages" or "Web sites") located on numerous computers around the world, which are referred to as "Web servers", and which are logically connected by the Internet. A Web document is a file which typically references other Web documents using hypertext links. A hypertext link generally specifies an address and a path to a particular file on a particular Web server. Hypertext links are often represented in the form of a standardized character string, such as a Uniform Resource Locator (URL). A hypertext link is generally activated by a user's either manually inputting the link or by selecting a key word, phrase, or image in a Web document (a "hypertext anchor"). Web documents are often written in HyperText Mark-up Language (HTML), which defines fonts, graphics, hypertext links and other aspects of the documents. Web documents are often communicated between Web servers and clients using a protocol known as HyperText Transfer Protocol (HTTP). Web browser software executed on a client computer system typically provides a graphical user interface by which a user of the client computer system can request and view Web documents stored on remote Web servers.

Figure 1:
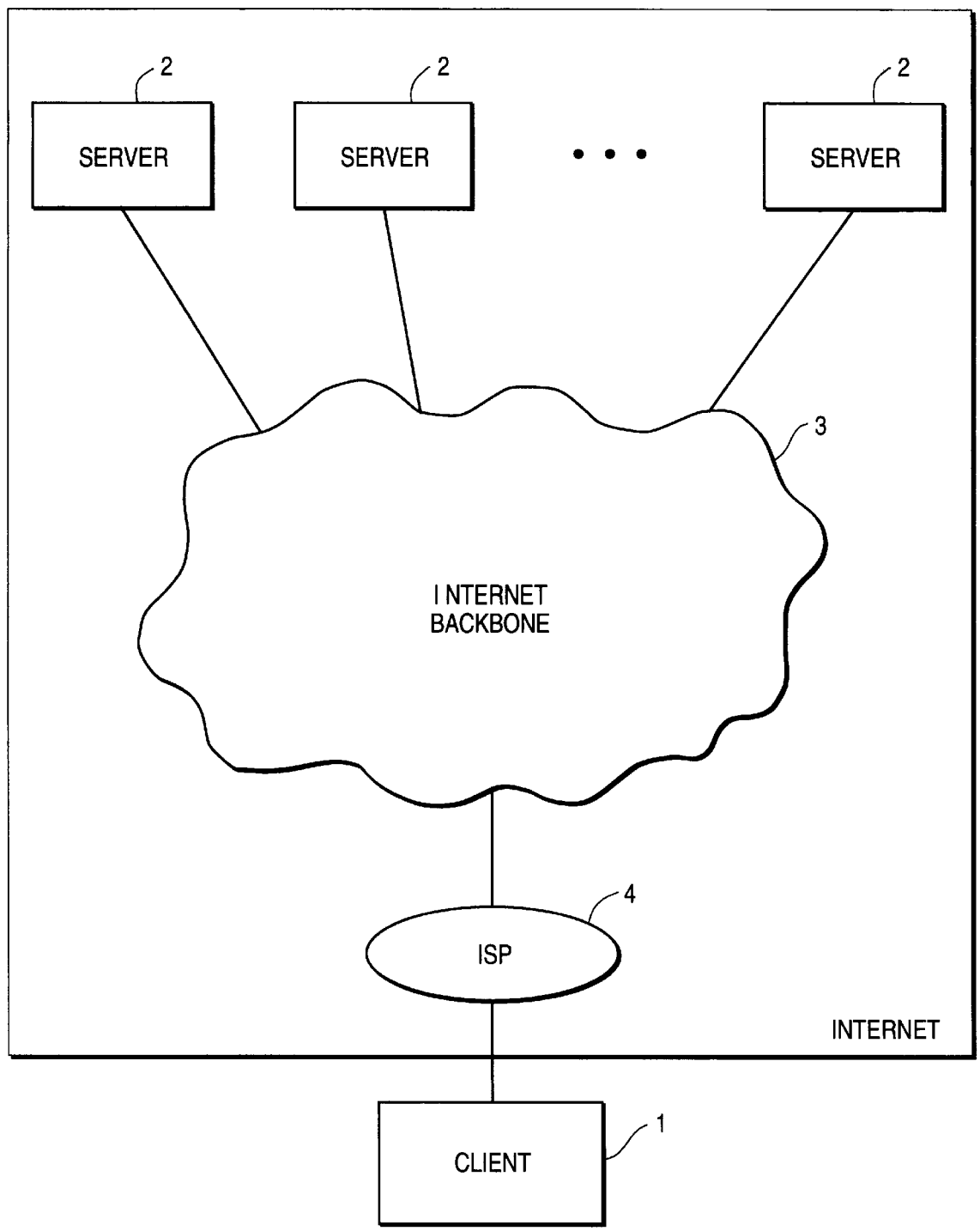
FIG. 1 illustrates a network configuration including a client computer system and a number of server computer systems.

FIG. 1 illustrates a network configuration including a client computer system (hereinafter "client") 1 and a number of server computer systems (hereinafter "server") 2. The client 1 is indirectly coupled to each of the servers 2 through the Internet backbone 3. In the embodiment shown in FIG. 1, the connection to the Internet backbone 3 is provided to the client 1 by an Internet Service Provider (ISP) 4. In one embodiment, the servers 2 are Web servers which store Web documents and provide Web documents to the client 1 in response to requests from the client 1.

Figure 2:
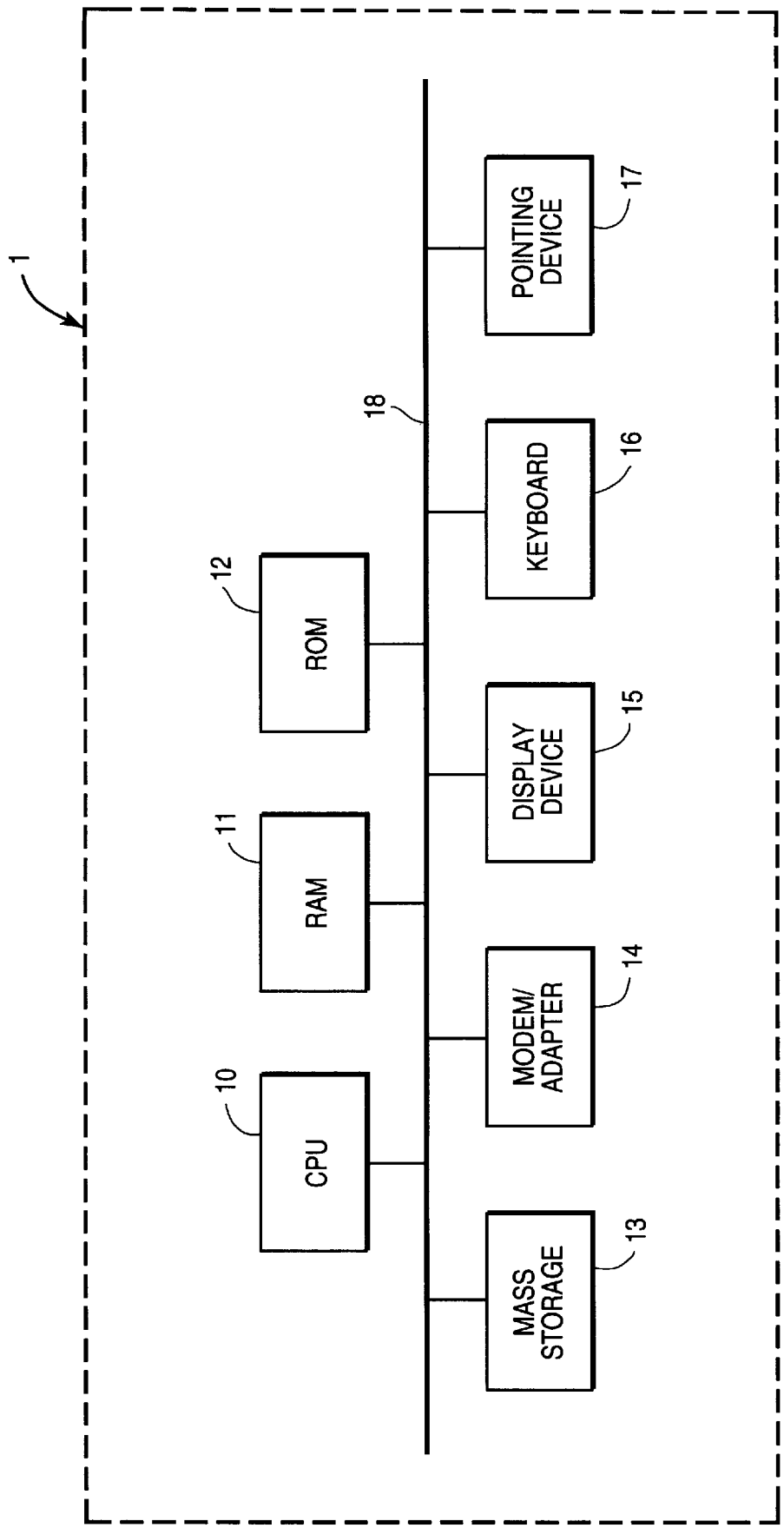
FIG. 2 is a block diagram of a client computer system.

FIG. 2 illustrates the hardware architecture of the client 1 according to one embodiment. It will be recognized that any or all of the servers 2 may also have the architecture illustrated in FIG. 2 or a similar architecture. The client 1 includes a central processing unit (CPU) 10, random-access memory (RAM) 11, and read-only memory (ROM) 12, each of which is coupled to a bus 18. Also coupled to the bus 18 are a mass storage device 13, a modem/adapter 14, a display device 15, a keyboard 16, and a pointing device 17.

ROM 12 may be any conventional non-volatile storage device. Alternatively, ROM 12 may be, or may include, a programmable non-volatile storage device, such as flash memory or electrically erasable programmable read-only memory (EEPROM). Mass storage device 13 may be any conventional non-volatile device suitable for storing large volumes of data, such as a magnetic or optical disk or tape. Modem/adapter 14 may be a standard telephone modem, a cable television modem, an Integrated Services Digital Network (ISDN) adapter, or any other suitable data communication device. Display device 15 may be any conventional visual display device, such as a Cathode Ray Tube (CRT) or a Liquid Crystal Display (LCD). Pointing device 17 may be any conventional device for moving a displayed pointer or cursor on a display device, such as a mouse, trackball, stylus with light pen, or the like. Bus 18 may represent multiple buses, which may be interconnected by various adapters and/or controllers.

In one embodiment, the present invention is carried out in the client 1 by the CPU 10 executing sequences of instructions that are contained in a memory. More specifically, execution of the sequences of instructions contained in the memory causes the CPU 10 to perform steps according to the present invention which will be described below. For example, instructions may be loaded into RAM 11 from a persistent store, such as mass storage device 13, ROM 12, and/or from one or more other computer systems (collectively referred to as a "host computer system") over a network. For example, one or more of the servers 2 illustrated in FIG. 1 may function as such a host computer system. The host computer system may transmit a sequence of instructions to a target computer system, such as the client 1, in response to a message transmitted to the host computer system over a network by the target computer system. As the target computer system receives the instructions via a network connection, such as the modem/adapter 14, the computer stores the instructions in memory. The computer system may store the instructions for later execution, or it may execute the instructions as they arrive over the network connection.

In some cases, the downloaded instructions may be directly supported by the CPU 10. Consequently, execution of the instructions may be performed directly by the CPU 10. In other cases, the instructions may not be directly executable by the CPU 10. Under such circumstances the instructions may be executed by causing the CPU 10 to execute an interpreter that interprets the instructions, or by causing the CPU 10 to execute instructions which convert the received instructions to instructions which can be directly executed by the CPU 10.

In other embodiments, hardwired circuitry may be used in place of, or in combination with, software instructions to implement the present invention. Thus, the present invention is not limited to any specific combination of hardware circuitry and software, nor to any particular source for the instructions executed by a computer system.

The present invention includes a technique for representing a portion of the Web as a visual map which graphically indicates the relevance of particular Web documents to a user's search criteria. In one embodiment, the present invention is implemented as a component of a Web browser. Assume now that a user of the client 1 wishes to perform a search for information on the Web. The user is prompted to input search criteria. In accordance with one embodiment of the present invention, the user is prompted to input several search terms relating to his subject of interest. In particular, the user is prompted to enter several search terms varying in specificity from very general to very specific. A search agent software module then uses the user-specified search criteria to generate a search request that is compatible with one or more conventional search engines. The conventional search engine or engines then performs the search and returns the results to the search agent. The search agent reorganizes the results based on their content by further analysis of the standard search results. More specifically, the search agent ranks the search results according to the relevance of each document to the user's search criteria. A representation of the Web documents in the search results is then generated and displayed in the form of a visual map of the search results, an example of which is illustrated in FIG. 3.

Figure 3:
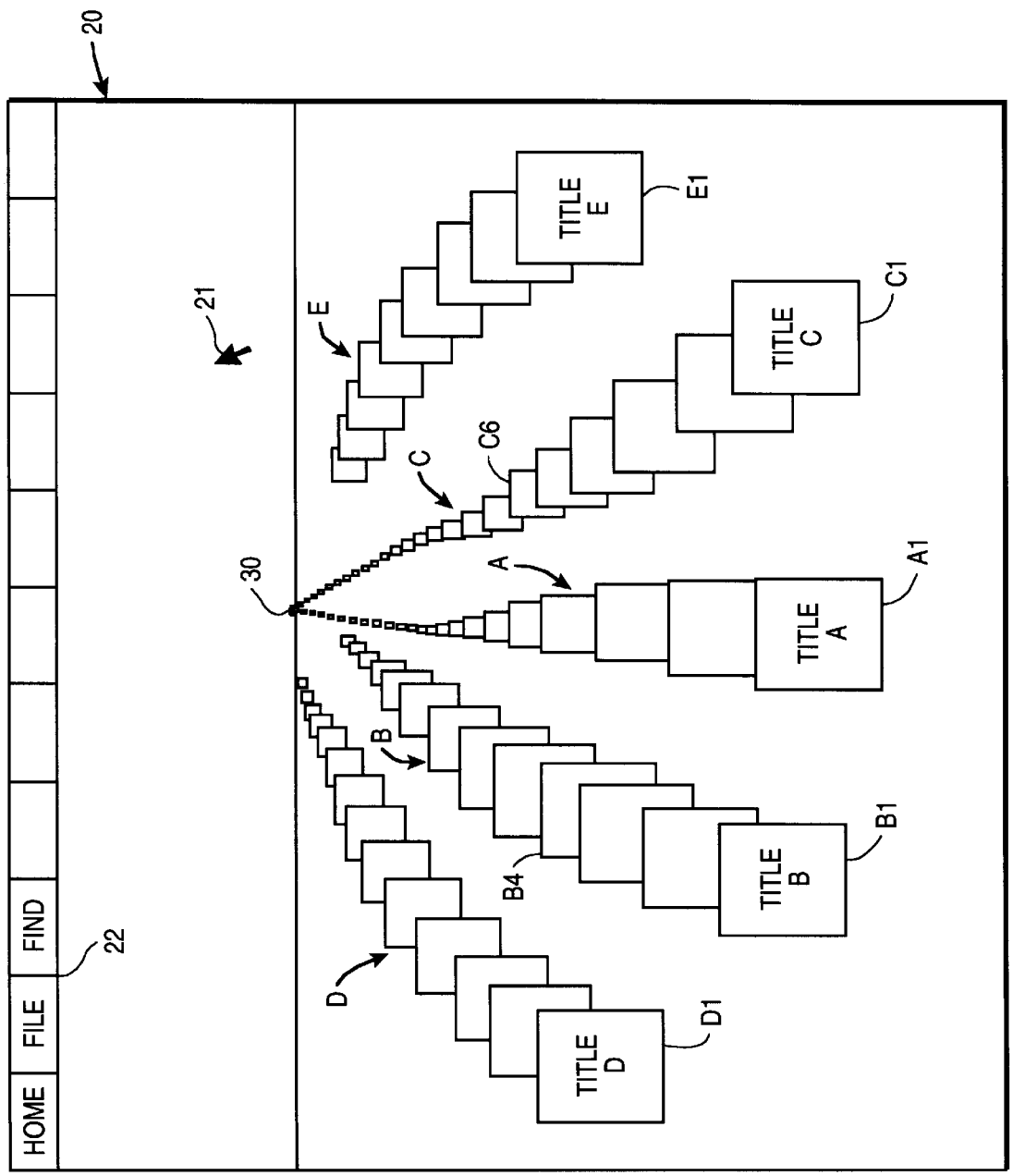
FIG. 3 illustrates a display showing objects representing a number of Web documents.

FIG. 3 illustrates a display 20 which is rendered on the display device 15 of the client system 1. The display 20 shows a map of a portion of the Web according to one embodiment of the present invention. The map includes a number of displayed objects, such as objects A1, B1, C1, D1 and E1, each of which represents a Web document found in a search of the Web. The objects may be simple shapes, such as rectangles, squares, circles, etc., or they may be more complex objects, such as bitmaps, icons, and other more complex images. In one embodiment, each object includes a label indicating the title, subject, or keywords of the Web document it represents.

The location of each object on the display 20 indicates the degree of relevance of the corresponding Web document to the user's search criteria. For example, in the embodiment shown in FIG. 4, the objects are organized into five rows, rows A, B, C, D and E. Objects in row A, which is aligned closest with the user's point of view (i.e., closest with a centered vertical axis of the display), represent Web documents that are most relevant to the user's specified search criteria, whereas objects in rows aligned farthest from the user's point of view, such as rows D and E, represent Web documents that are least relevant to the user's search criteria. In addition, objects which appear to be closer to the user (i.e., larger and closer to the bottom of the display 20) are more relevant to the user's search criteria than objects that appear to be farther from the user (i.e., smaller and closer to the vanishing point 30).

Thus, objects A1, B1, C1, D1 and E1, represent Web documents that are more relevant to the search criteria than the documents represented by objects B4, C6 or E3. Object B1 represents a document that is more relevant than the document represented by object E1, and object A1 represents the document determined that is most relevant.

The display 20 also includes a pointer 21, the location of which is controlled by the user using the pointing device 17. The pointer 21 is used to select objects and initiate various functions, as will be described below. The display 20 also includes a menu bar 22, by which the user can access various functions provided by the Web browser using the pointer 21 to activate soft buttons or pull-down menu items.

In one embodiment of the present invention, search results are displayed to the user as follows. Retrieved Web documents which have strong correspondence to (e.g., include a high number of occurrences of) all search terms are displayed as objects appearing to be closest to the user and closest to the center of the display 20 horizontally. Hence, object A1 represents the Web document having the strongest relevance to the search criteria. Web documents which correspond to all search criteria but which have a lesser overall degree of relevance to the search criteria are displayed in this embodiment as objects in the center row, row A; however, such objects appear to be farther from the user than objects representing more relevant documents. Similarly, Web documents which have a strong correspondence to some, but not all, of the search criteria are represented by objects in rows that appear off center, such as rows B and C. Those Web documents having the greatest relevance to the search criteria within this category are displayed within these rows as objects closer to the user, while those documents having lesser relevance are displayed within these rows as objects farther from the user. Thus, Web documents having a high degree of correspondence only to the more general search criteria are displayed in this embodiment as objects in the outermost rows, rows D and E. Alternatively, the other rows might be used for objects which have a low degree of correspondence to all search criteria. Further, it will be recognized that these "alternative" ways of organizing the map are not necessarily mutually exclusive.

Numerous variations on the above-described layout scheme are possible within the scope of the present invention. For example, objects may be assigned to a particular row based on the degree of relevance either to a single criterion or based on an overall degree of relevance to multiple criteria. Similarly, objects representing Web documents may be assigned particular locations within a row based on the degree of correspondence with either a single criterion or with multiple criteria.

Consider an example in which the user is a student who wishes to obtain historical information from the Web on the Spanish explorer, Ponce de Leon. Hence, the user is prompted to input several search criteria having several different degrees of specificity. These search criteria have various different levels of specificity with respect to the subject, Ponce de Leon. Assume, therefore, that the user enters the following search criteria, given roughly in order of increasing specificity: "history", "explorers", "North America", "Spaniards", and "Ponce de Leon". It is advantageous to use a variety of different levels of specificity in order to increase the likelihood of retrieving relevant documents. For example, if the term "Ponce de Leon" were used as the only search criterion, then the search might retrieve irrelevant documents, such as one describing a restaurant named Ponce de Leon. Conversely, if only "history" and "North America" were used as search criteria, the search might yield an undesirable number of Web documents which do not relate to Ponce de Leon.

Assume now that the search has been completed. Referring again to FIG. 3, in one embodiment objects representing documents that have a strong correspondence to all of the criteria (history, explorers, North America, Spaniards, and Ponce de Leon) are assigned to row A. For objects within row A, the position of the object within row A depends upon its degree of correspondence only to the most specific criterion, Ponce de Leon. Objects representing Web documents are assigned to the outer rows D and E when they have a strong correspondence to only the more general criteria, such as history, with little or no correspondence to the more specific criteria. In an alternative embodiment, objects might be organized within row A according to the corresponding Web documents' overall degree of correspondence to all five criteria. An overall degree of correspondence might be computed, for example, as a weighted average of the number of hits on each particular search term within each document, where weights are assigned based on the specificity of the search terms. Also, in an alternative embodiment, the outer rows might be reserved for objects representing Web documents having a low overall degree of relevance to all criteria.

Figure 4:
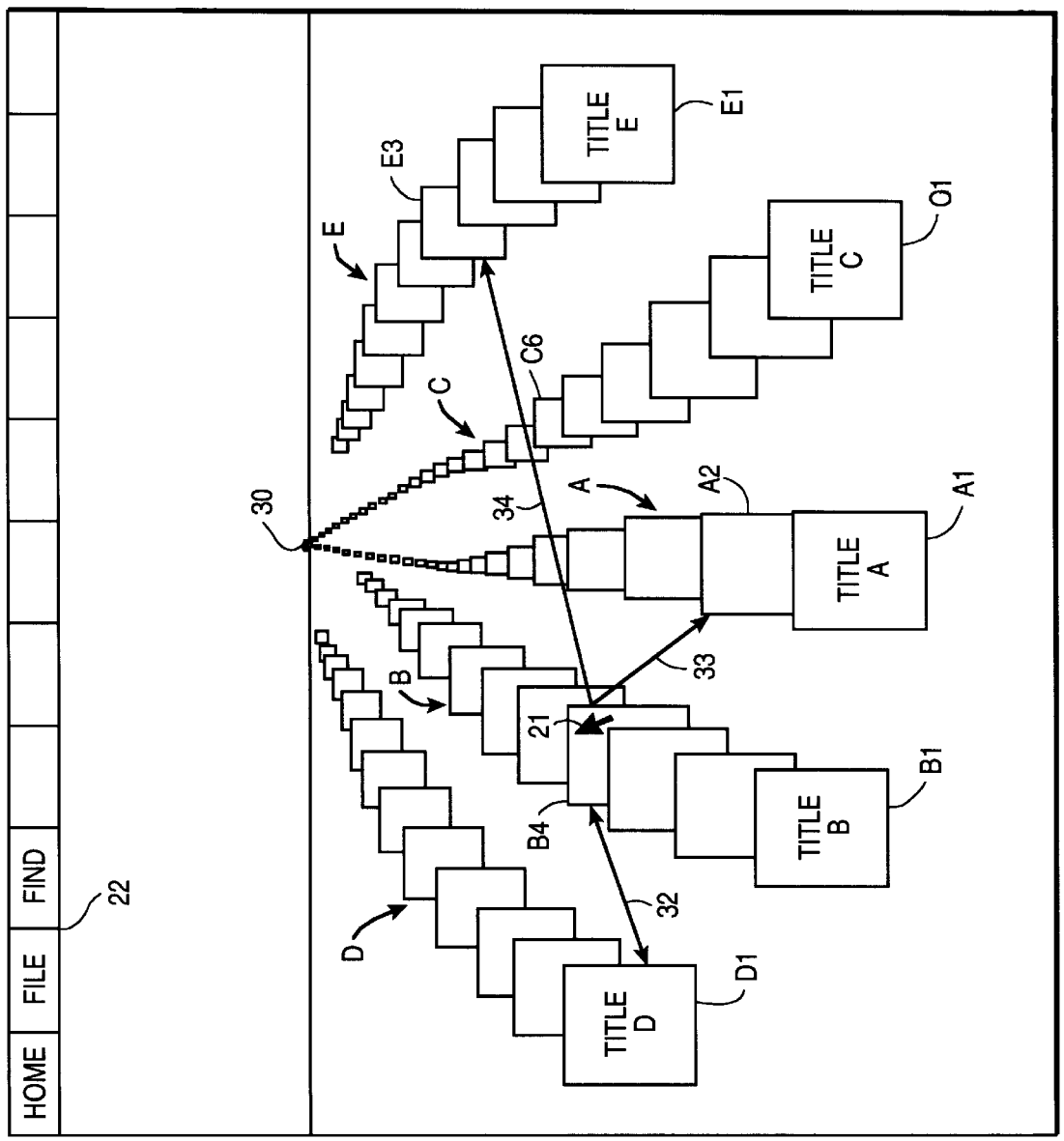
FIG. 4 illustrates a display showing objects representing a number of Web documents, with arrows representing hypertext links between Web documents.

The present invention also includes a technique for visually representing hypertext links between Web documents. Referring now to FIG. 4, an embodiment is illustrated in which the display 20 includes arrows connecting objects to represent hypertext links. It will be recognized that hypertext links can be represented within the scope of the present invention in ways other than by using arrows. In FIG. 4, arrows 32, 33, and 34 connect object B4 with objects D1, A2, and E3, respectively. The arrows 32, 33, and 34 indicate that the Web documents represented by objects D1, A2, and E3 can be viewed by selecting hypertext anchors located in the document represented by object B4. The arrowhead on each of the arrows 32, 33 and 34 represents the logical "direction" of the hypertext link. A hypertext link may be may be unidirectional or bidirectional. A hypertext link is unidirectional if a source Web document contains a hypertext anchor for a destination Web document by the hypertext link, but the destination document does not contain a hypertext anchor for the source document. Conversely, a hypertext link is bidirectional if the source Web document contains a hypertext anchor for a destination Web document by the hypertext link, and the destination document also contains a hypertext anchor for the source document.

In various embodiments, arrows representing hypertext links may be shown for all objects included in the map, or for only selected objects. In an alternative embodiment, which is represented in FIG. 4, hypertext links are shown only for one Web document at a time and only when the user selects that Web document's object, as illustrated in FIG. 4 by pointer 21 being positioned on object B4. This embodiment avoids cluttering the map with too many hypertext links. The arrows may be displayed automatically when the pointer 21 becomes positioned over an object, or they may be displayed only when the user selects the object, such as by clicking a button on the pointing device 17. In another embodiment, in response to the user's positioning the pointer 21 over an object and clicking a mouse button, an Options menu is opened, from which the user can cause a new window to be displayed showing the hypertext links.

Figure 5:
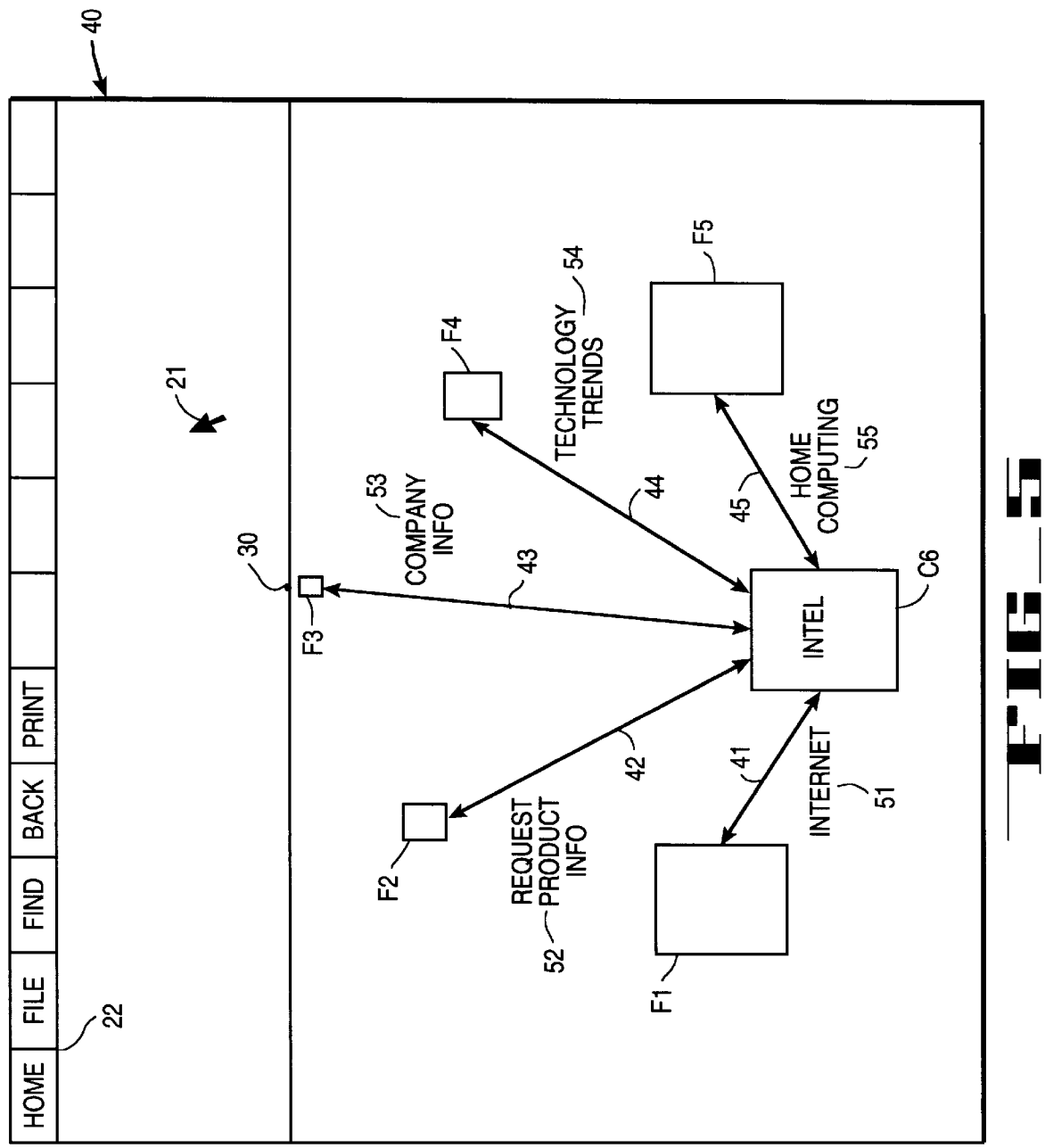
FIG. 5 illustrates a display showing a representation of a Web document and its hypertext links to other Web documents.

In another embodiment, which is illustrated in FIG. 5, hypertext links for a given Web document may be shown in a secondary display in response to the selection of an object. For example, upon selecting a given object, a secondary display can be generated showing only that object and objects which are "linked to" (via hypertext) that object. FIG. 5 illustrates an example of such a secondary display 40 generated in response to the user's selection of object C6 from display 20 (in FIG. 3). In this example, object C6represents the "home page" on the Web of Intel Corporation of Santa Clara, Calif. Each Web document directly linked to the Intel home page is then represented as another object in display 40, namely objects F1, F2, F3, F4 and F5. Each of objects F1 through F5 is displayed at an apparent depth which indicates the relevance of the corresponding document to the search criteria, as described above. For purposes of this secondary display 40, however, the selected object C6 is displayed centered and apparently near to the user, regardless of the relevance of the Intel home page to the search criteria. In other embodiments, however, the original position of the selected object can be carried over to the secondary display or it can be adjusted in some other manner. Hypertext links between the Intel home page and the documents represented by objects F1 through F5 are represented by arrows 41 through 45, respectively.

In one embodiment, Web documents referenced by the selected Web document are represented in the secondary display 40 only if they appeared in the map of display 20 (FIG. 3). In another embodiment, however, all documents linked to the selected Web document are represented in the secondary display 40, even if they were not included in the search results; this (second) embodiment might be implemented, for example, if the selected document has already been downloaded to the client 1, such that its hypertext links are known to the client 1.

Figure 6:
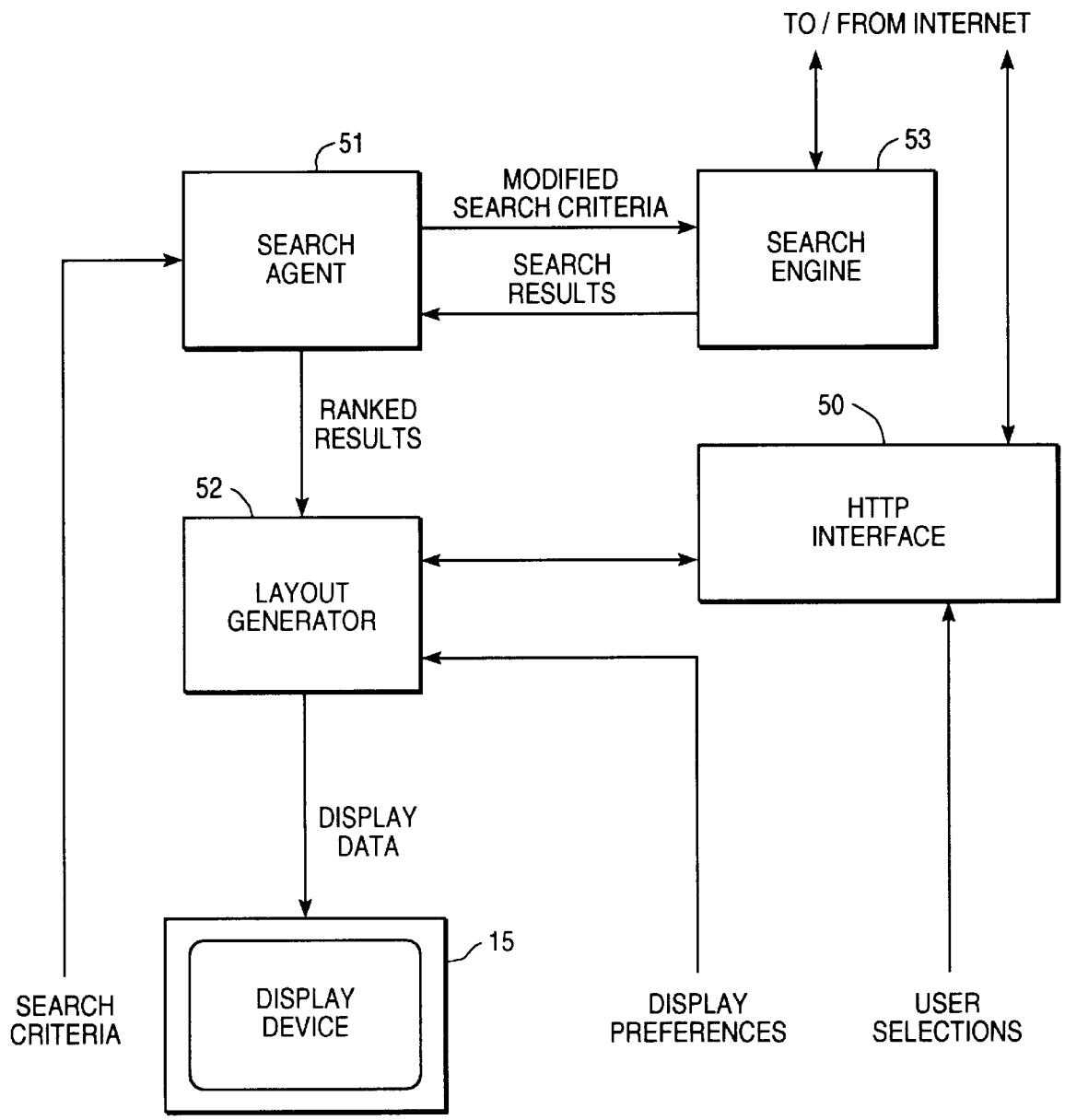
FIG. 6 is a block diagram of software components used to implement the present invention.

FIG. 6 illustrates a configuration of software components used to implement the present invention. A search agent 51 receives search criteria input by a user. The search agent 51 prompts the user to specify the search criteria in a particular manner or form, i.e., as several terms with varying degrees of specificity. The search agent 51 then generates a search request that is compatible with a conventional search engine 53 and provides the request to the search engine 53. In response, the search engine 53 searches the Web and return the results to the search agent 51.

The search agent 51 then examines the content of the search results, reorganizes, and, if necessary, filters the search results. This examination may include, for example, examining the context of keywords from the search criteria, such as whether keywords appear in the title of the Web page as opposed to in the body of the Web page. This process may also include performing secondary searches of the initial search results. Such a secondary search might include the combining of certain search terms (e.g., "the explorer Ponce de Leon"), for example. The ranked search results are then provided by the search agent 51 to a layout generator 52.

The layout generator 52 generates an object for each document in the ranked results and determines the appropriate position and other display attributes (i.e., size, color, texture, etc.) of the objects. The layout generator sends display data including this layout information to the display device 15, which causes the display device 15 to display a map of Web sites, such as that shown in FIGS. 3 through 5. Display preferences input by the user are input to the layout generator 52 to enable the layout generator to determine the appropriate display attributes.

An HTTP interface 50 is also in communication with the layout generator 52. The HTTP interface 50 receives various inputs from the user, such as selections of objects in the map and inputs for activating hypertext links. Such inputs are communicated by the HTTP interface 50 to the layout generator 52 to cause the layout generator to modify the display accordingly. In one embodiment, for example, when the user selects a particular object in the map, then this event is communicated to the layout generator 52 to cause the layout generator to generate a secondary window, such as secondary window 40 in FIG. 5. Further, if the user double-clicks on an object in the secondary window of FIG. 5, then in response, the HTTP interface 50 activates the corresponding hypertext link in order to transmit a request for the Web document represented by that object to the appropriate Web server.

Figure 7:
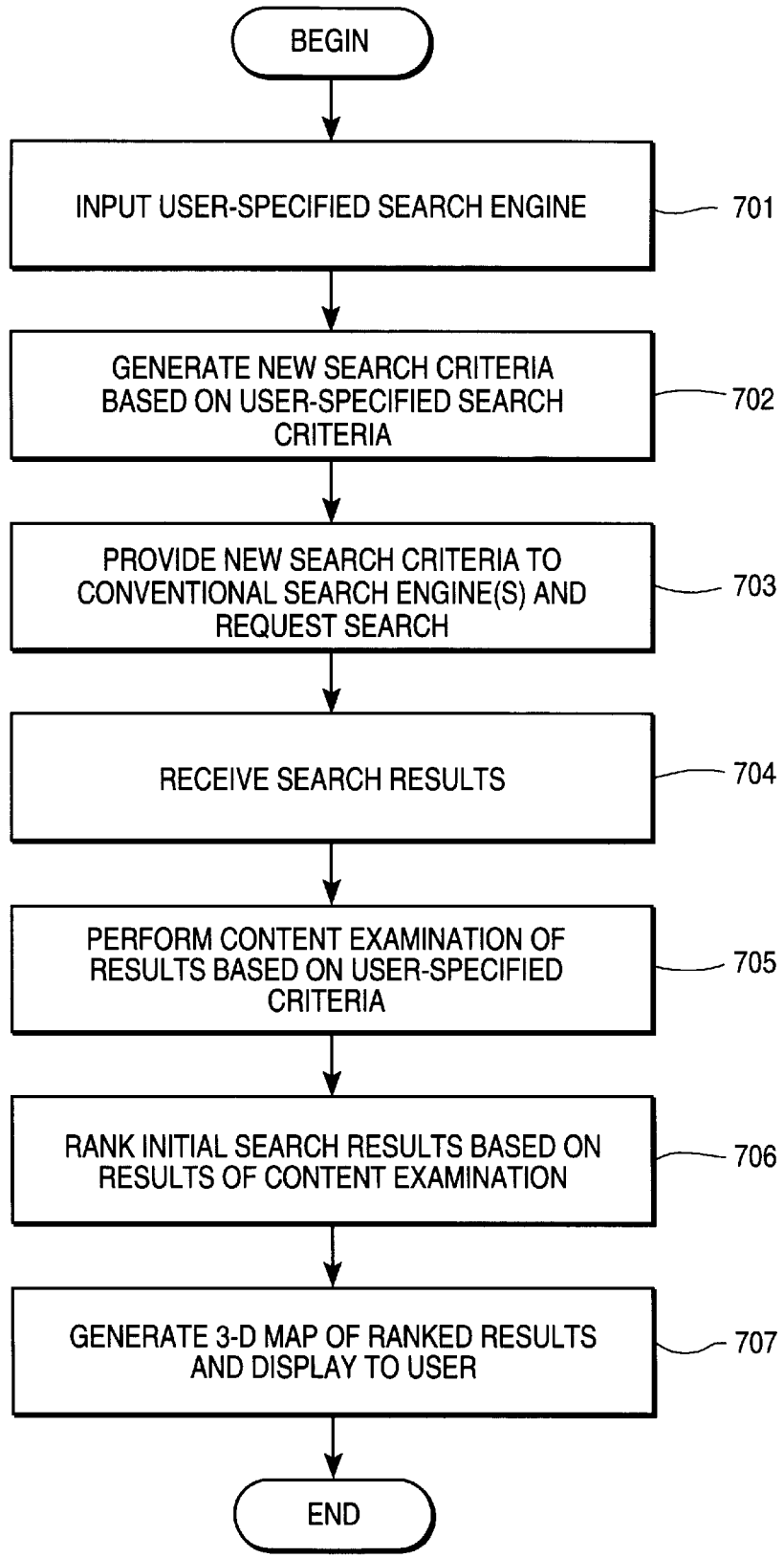
FIG. 7 is a flow diagram illustrating an overall routine for generating a visual map of a portion of the Web based on the results of a search.

FIG. 7 illustrates an overall process of generating a 3-D map of a portion of the Web according to one embodiment. In step 701 search criteria are input by the user to the search agent 51. In step 702 the search agent 51 generates a search request based on the user-specified search criteria. The search request is generated to be compatible with the conventional search engine 53. Thus, in step 703 the search request is provided to the conventional search engine 53 and a search is performed. When the search results are retrieved by the search engine 53, the search results are provided to and received by the search agent 51 in step 704.

In step 705 the search agent 51 examines the content of the search results with respect to the user-specified criteria. That is, the search agent 51 examines the content of the search results in terms of the degree of correspondence to the user-specified search criteria. Certain retrieved Web documents may be eliminated from consideration in this step if, for example, such documents do not include at least a minimum number of hits. In addition, Web documents which contain an unreasonable number of hits in view of the length of the document (such as when the author attempts to attract hits using mass repetition of content) may also be eliminated at this step. Thus, as part of step 705, the search agent 51 identifies Web documents that are not likely to be relevant to the search criteria and eliminates them from consideration. Further searches using phrases or word pairs can be performed to refine the list. After the content examination is complete, the initial search results (minus any documents that were eliminated) are then ranked (reorganized) in step 706 to reflect their degree of relevance to the user's search criteria. In step 707 the layout generator 52 generates display data to cause the 3-D map to be displayed to the user, such that the position of each object representing a Web document reflects the relevance of the document to the user's criteria.

FIG. 8 illustrates the step 707 of generating a 3-D map in greater detail, according to one embodiment. In step 801, for a given search criterion, the objects are assigned spatial positions on the display from front to back based on the number of hits for that criterion in each corresponding Web document. That is, the assignment of position in this step is based on the number of matches in each particular Web document to a particular search term. Referring again to the Ponce de Leon example, step 801 may involve locating all objects into row A (see FIG. 3) which represent Web documents that include the most specific term, "Ponce de Leon". The Web document having the greatest number of occurrences of the term, "Ponce de Leon", is represented as object A1, whereas the Web document having the fewest number of occurrences (greater than 0) of that term is represented as the object in row A that is closest to the vanishing point 30. Step 801 is then repeated (per step 802) until each search criterion has been processed, such that the objects are organized into a number of sets (e.g., rows). For example, step 801 is repeated for the search criteria "history", "explorers", "North America", and "Spaniards".

In step 803, each resulting set of Web documents is then assigned a position on the screen which reflects the overall degree of relevance of that entire set to the user's objective. In particular, rows which are sorted according to the most specific search criteria are aligned most closely with the user's point of view, while rows that are sorted according to more general criteria are aligned toward the peripheral of the user's point of view (i.e., towards the perimeter of the display). For example, the most-centered row in FIG. 3, row A, is sorted according to the most specific search criterion, "Ponce de Leon", while the outermost rows D and E are sorted according to the more general criteria, "history" and "explorers".

Various attributes of the displayed objects and attributes of connections between objects can be used to further indicate relevance and other information relating to Web sites. For example, connections (e.g., arrows) representing hypertext links can be color-coded to indicate the degree of relevance of Web documents to the search criteria. A green arrow from a first object to a second object might be used to indicate that the Web document represented by the second object is highly relevant to the search criteria, with a red arrow indicating a very low degree of relevance and an orange arrow indicating a moderate degree of relevance. Other attributes, such as the shape, size, color, texture, contrast, brightness, or degree of focus of an object can be used to indicate relevance. For example, to enhance the perception of depth, objects that are displayed close to the vanishing point 30 may be shown slightly out of focus and/or at a lower level of brightness and/or contrast. The user may be permitted to select a preferred shape or color to represent Web documents that are highly relevant. Each of these techniques for indicating relevance may be used either as a supplement to, or an alternative to, the use of depth to indicate relevance.

In addition, the above-mentioned attributes can also be used to represent other parameters, such as the popularity of a Web document (e.g., based on the number of recent requests for the document), the number of hypertext links referenced by a Web document, or the length of a Web document (e.g., as measured by the number of words included, its memory requirement, etc.). For example, a bright red object might represent a very popular document, while a dull, gray object may represent an object which has received few requests. These parameters may be provided automatically by the Web server, or they may be specifically requested by the client 1 for purposes of generating the map. The user may be permitted to select which attribute shall used to represent any given parameter.

The present invention also includes a technique for displaying certain semantic information in association with hypertext links. Such a technique is advantageous, because it increases the user's understanding of the content of the search results. In particular, connections representing hypertext links are labeled with descriptors, i.e., key words, symbols, or images, to describe the relationships between documents. Referring again to FIG. 5, labels 51 through 55 annotate arrows 41 through 45, respectively, to describe the represented hypertext links. Hence, the user can see that object F2 represents a Web page relating to the requesting of product information. An HTML tag for a hypertext link might be used to label a connection. Alternatively, substantive content from the Web document may be used. For example, a predetermined number of words preceding or following a hypertext anchor might be taken as a descriptor to label the corresponding arrow. Alternatively, an image close to a hypertext anchor or the hypertext anchor itself might be used as a descriptor.

Thus, a method and apparatus for graphically representing a portion of the World Wide Web have been described. Although the present invention has been described with reference to specific exemplary embodiments, it will be evident that various modifications and changes may be made to these embodiments without departing from the broader spirit and scope of the invention as set forth in the claims. Accordingly, the specification and drawings are to be regarded in an illustrative rather than a restrictive sense.

What is claimed is:

1. A computer-implemented method of representing data, the method comprising the steps of:

receiving results of a first search of data distributed among a plurality of computers on a network, the results corresponding to user-provided search criteria, the results including a plurality of sets of data;

automatically refining said results of the first search based on relevance of each of the sets of data to the user-provided search criteria by performing a content examination of said results;

generating a ranking of the plurality of sets of data based on results of said refining;

generating a map of the sets of data, the map for visually indicating the ranking, wherein the map includes a plurality of objects, each of the objects representing one of the data sets; and causing the map to be displayed on a display device, the map having a three-dimensional appearance, such that the ranking is indicated by the apparent relative positioning of the objects in three dimensions.

2. A computer-implemented method according to claim 1, wherein the network is a wide area network, such that the data sets are distributed over the wide area network.

3. A computer-implemented method according to claim 1, wherein the ranking is indicated in the map, at least in part, by at least one attribute of a given one of the objects from the list consisting of:
   a color of the given one of the objects;
   a size of the given one of the objects;
   a shape of the given one of the objects; and
   a texture of the given one of the objects.

4. A computer-implemented method according to claim 1, wherein the plurality of sets of data comprises a plurality of World Wide Web pages, such that each of the objects represents one of the World Wide Web pages.

5. A computer-implemented method according to claim 4, wherein the plurality of World Wide Web pages are referenced by a plurality of links, wherein the step of causing the map to be displayed comprises the step of causing the links to be represented on the display device as connections between objects.

6. A computer-implemented method according to claim 4, wherein the method is performed in conjunction with executing a program for browsing the World Wide Web.

7. A method of enabling a target computer to represent a plurality of sets of data, the sets of data distributed among a plurality of computers connected on a network, the method comprising the step of transmitting sequences of instructions from a host computer to a target computer, the sequences of instructions including instructions which, when executed on the target computer, cause the target computer to perform the method recited in claim 1.

8. In a computer system including a processor and a display device coupled to the processor, a method of visually representing hypermedia data sets distributed on a computer network, the method comprising the steps of:
   receiving results of a first search, the results including a plurality of hypermedia data sets having a correspondence to user-specified criteria, wherein the plurality of hypermedia data sets are referenced by a plurality of hypermedia links;
   automatically refining said results of the first search based on relevance of each of the sets of data to the user-provided search criteria by performing a second search including a content examination of said results;
   ranking the plurality of hypermedia data sets based on results of said refining;
   generating a map of the plurality of hypermedia data sets based on the results of said ranking, the map including a plurality of objects, each representing one of the plurality of hypermedia data sets; and
   causing the map to be displayed on the display device, the map including an arrangement of objects having a three-dimensional appearance, such that the ranking is indicated by the apparent relative positioning of the objects in three dimensions, said step of causing the map to be displayed including causing the hypermedia links to be displayed as connections between the objects, such that a visual attribute of each of the connections indicates a degree of relevance to the user-specified criteria of a corresponding one of the hypermedia data sets.

9. A method according to claim 8, wherein the method is performed as an aspect of executing a program for browsing the World Wide Web.

10. A method according to claim 8, further comprising the step of representing a parameter associated with one of the hypermedia data sets using a visual attribute of an object corresponding to said one of the hypermedia data sets.

11. A method according to claim 10, wherein the parameter is one from the list consisting of:
   a number of requests for said one of the hypermedia data sets during a period of time;
   a number of hypermedia links referenced by said one of the hypermedia data sets; and
   a size of said one of the hypermedia data sets.

12. A method according to claim 10, wherein the visual attribute is at least one from the list consisting of:
   a color of the object corresponding to said one of the hypermedia data sets;
   the size of the object corresponding to said one of the hypermedia data sets;
   the shape of the object corresponding to said one of the hypermedia data sets;
   the texture of the object corresponding to said one of the hypermedia data sets; and
   the degree of focus of the object corresponding to set one of the hypermedia data sets.

13. A method according to claim 10, further comprising the step of receiving a user input for determining the visual attribute.

14. A method according to claim 8, wherein the indication of the ranking comprises at least one attribute of a given object from the list of attributes consisting of:
   a color of the given object;
   a size of the given object;
   a shape the given object;
   a texture of the given object;
   a contrast of the given object;
   a brightness of the given object; and
   a degree of focus of the given object.

15. A method according to claim 8, wherein each of the connections includes a direction indicator indicating a logical direction of the corresponding hypermedia link.

16. A method according to claim 8, further comprising the step of, for each of the hypermedia links, causing a description of the hypermedia link to be displayed in proximity with the corresponding connection.

17. A method according to claim 16, wherein the step of causing a description of the hypermedia link to be displayed comprises the steps of:
   identifying in one of the hypermedia data sets a hypermedia anchor associated with one of the hypermedia links;
   identifying at least one symbol located in proximity to the hypermedia anchor within said one of the hypermedia data sets; and
   designating said at least one symbol as the description for the hypermedia link corresponding to the hypermedia anchor.

18. In a computer system including a processor and a display device coupled to the processor, a method of representing a plurality of hypertext documents, the method comprising the steps of:
   receiving results of a first search of data distributed among a plurality of computers on a network, the results corresponding to a set of user-provided search criteria, the results including a plurality of hypertext documents;

automatically refining said results of the first search based on relevance of each of the hypertext documents to the set of user-provided search criteria by performing a second search including a content examination of said results;

ranking the plurality of hypertext documents based on a degree of relevance of each of the hypertext documents to the set of the user-specified search criteria;

generating a map of the plurality of said hypertext documents based on the ranking, wherein each of the hypertext documents is represented on the display device as one of a plurality of objects; and causing the map to be displayed on the display device, wherein the map has a three-dimensional appearance indicative of the ranking, such that the ranking is indicated by the apparent relative positioning of the objects in three dimensions.

19. A method according to claim 18, wherein the plurality of hypertext documents are referenced by a plurality of links, and wherein the method steps further comprise the steps of:

retrieving a hypertext document specified by one of the links; and causing the hypertext document specified by said one of the links to be displayed on the display device.

20. A method according to claim 18, wherein the plurality hypertext documents are referenced by a plurality of links, and wherein the step of causing the map to be displayed comprises the step of causing the links to be represented on the display device as connections between objects.

21. A method of enabling a target computer to represent a plurality of hypertext documents, the method comprising the step of transmitting sequences of instructions from a host computer to a target computer, the sequences of instructions including instructions which, when executed on the target computer, cause the target computer to perform the method recited in claim 20.

22. A method according to claim 18, further comprising the step of representing a parameter associated with one of the hypertext documents using a visual attribute of an object corresponding to said one of the hypertext documents.

23. A method according to claim 22, further comprising the step of receiving a user input associating the attribute with the parameter.

24. A method according to claim 22, wherein the visual attribute is at least one from the list consisting of:

a color of the object corresponding to said one of the hypertext documents;

a size of the object corresponding to said one of the hypertext documents;

a shape of the object corresponding to said one of the hypertext documents;

a texture of the object corresponding to said one of the hypertext documents; and a degree of focus of the object corresponding to said one of the hypertext documents.

25. A method according to claim 24, wherein the parameter is one from the list consisting of:

a number of requests for said one of the hypertext documents during a period of time;

the number of hypertext links referenced by said one of the hypertext documents; and the number of words in said one of the hypertext documents.

26. A computer system comprising:

a processor; and a memory coupled to the processor, the memory having instructions stored therein which, when executed by the processor, cause the processor to:

receive results of a search of data distributed among a plurality of computers on a network, the results corresponding to user-provided search criteria, the results including a plurality of hypertext documents;

refine said results of the first search based on relevance of each of the hypertext documents to the user-provided search criteria by performing a content examination of the results of the search;

rank the plurality of hypertext documents based on results of the content examination;

generate a map of the hypertext documents based on the ranking, wherein each of the hypertext documents is represented on the display device as one of a plurality of objects; and cause the map to be displayed on a display device, such that the map visually indicates logical links between hypertext documents, wherein the map includes an arrangement of objects having a three-dimensional appearance, such that a visual indication of the ranking comprises an apparent relative positioning of the objects in each of the three dimensions.

27. A computer system according to claim 26, wherein the visual indication of the ranking comprises at least one attribute of a given object from the list of attributes consisting of:

a color of the given object;

a size of the given object; and a shape of the given object.

28. A computer system according to claim 26, wherein the plurality of hypertext documents are referenced by a plurality of links, and wherein the plurality of hypertext documents comprises a plurality of World Wide Web pages.

29. A computer system according to claim 28, wherein each of the hypertext documents is one of the plurality of World Wide Web pages.

30. A computer system according to claim 28, wherein the method steps further comprise the steps of:

retrieving a Web page specified by one of the links; and causing the Web page specified by said one of the links to be displayed on the display device.

31. A computer system according to claim 28, wherein the instructions are executed by the processor in conjunction with execution of instructions for generating a Web browser.

32. A computer system according to claim 28, wherein the logical links between the hypertext documents comprise a plurality of hypertext links corresponding to the World Wide Web pages, wherein the instructions for causing the map to be displayed comprise instructions for causing the hypertext links to be represented on the display device as connections between objects.

33. A computer system according to claim 28, wherein the instructions which cause the processor to generate the visual map further comprise instructions which cause the processor to display a description of each hypertext link in proximity to the corresponding connection for each hypertext link.

34. A machine-readable program storage medium, the program storage medium tangibly embodying a program of instructions executable by a machine to perform method steps for representing a portion of the World Wide Web, the method steps comprising the steps of:

receiving results of a first search of data distributed among a plurality of computers on a network, the results corresponding to user-provided search criteria, the results including a plurality of World Wide Web documents, wherein the plurality of World Wide Web documents are referenced by a plurality of hypertext links;

automatically refining said results of the first search based on relevance of each of the World Wide Web documents to the user-provided search criteria by performing a second search including content examination of said results;

ranking the plurality of World Wide Web documents based on results of said refining;

generating a map of the plurality of World Wide Web documents based on the ranking, wherein each of the World Wide Web documents is represented by one of a plurality of objects; and causing the map to be displayed on the display device, the map having a three-dimensional appearance such that the ranking is indicated by the relative positioning on the display device at the objects in three dimensions, said step of causing the map to be displayed including causing the links to be represented on the display device at connections between the objects, such that a visual attribute of one of the connections indicates a degree of relevance to the user-specified search criteria of a corresponding one of the World Wide Web documents.

35. A machine-readable program storage medium according to claim 34, wherein the indication of the ranking comprises a color of at least one object.

36. A machine-readable program storage medium according to claim 34, wherein the indication of the ranking comprises a size of at least one object.

37. A machine-readable program storage medium according to claim 34, wherein the indication of the ranking comprises a shape of at least one object.

38. A machine-readable program storage medium according to claim 34, wherein the indication of the ranking comprises a texture of at least one object.

39. A machine-readable program storage medium according to claim 34, wherein the indication of the ranking comprises a contrast of at least one object.

40. A machine-readable program storage medium according to claim 34, wherein the indication of the ranking comprises a brightness of at least one object.

41. A machine-readable program storage medium according to claim 34, wherein the indication of the ranking comprises a degree of focus of at least one object.

42. A machine-readable program storage medium according to claim 34, wherein the method steps further comprise the steps of:

retrieving a Web document specified by one of the hypertext links; and causing the Web document specified by said one of the hypertext links to be displayed on the display device.

43. A machine-readable program storage medium according to claim 34 wherein the method comprising the step of, for each of the hypertext links, causing a description of the hypertext link to be displayed in proximity to the corresponding connection.

44. A machine-readable program storage medium according to claim 31 wherein the method of causing a description of the hypertext link to be displayed comprises the steps of:

identifying one of the Web documents a hypertext anchor associated with one of the hypertext links;

identifying at least one symbol located in proximity to the hypertext anchor within said one of the Web documents; and designating said at least one symbol as the description for the hypertext link corresponding to the hypertext anchor.

45. An apparatus for rendering a map of a plurality of hypertext-based documents on a display device, the apparatus comprising:

means for receiving results of a first search of data distributed among a plurality of computers on a network, the results corresponding to user-provided search criteria, the results including a plurality of hypertext-based documents;

means for automatically refining said results of the first search based on relevance of each of the hypertext-based documents to the user-provided search criteria by performing a second search including content examination of said results;

means for generating a ranking of the plurality of hypertext-based documents based on results of said refining;

means for generating a map of the plurality of hypertext-based documents based on the ranking, wherein the map includes a plurality of objects displayed on the display device, each of the objects representing a least one of the hypertext-based documents, and wherein hypertext links between the hypertext-based documents are represented as connections between the objects; and means for causing the map to be displayed on the display device such that the map visually indicates the ranking, the map having a three-dimensional appearance, wherein the apparent relative positioning of the objects within the three-dimensional map indicates the degree of relevance of the hypertext-based documents to the user-specified criteria.

46. An apparatus according to claim 45, the apparatus further comprising means for generating a Web browser.

* * * * *